United States Patent Office 3,845,063
Patented Oct. 29, 1974

3,845,063
PREPARATION OF SYMMETRICAL
4-(DIALKYLAMINO)PHENOLS
Dean M. Balls, Chamblee, Ga., assignor to The Dow
Chemical Company, Midland, Mich.
No Drawing. Continuation-in-part of application Ser. No. 102,179, Dec. 28, 1970, which is a continuation-in-part of application Ser. No. 60,646, Aug. 3, 1970, both now abandoned. This application Dec. 29, 1972, Ser. No. 319,900
Int. Cl. C07d 29/16
U.S. Cl. 260—293.84                 13 Claims

ABSTRACT OF THE DISCLOSURE

Symmetrical 4-(dialkylamino)phenols are prepared by a method which comprises reacting in the presence of an inert polar solvent a 4-bromophenol with a saturated compound having an amino type nitrogen atom which has one replaceable hydrogen atom thereon.

CROSS REFERENCE TO RELATED APPLICATIONS

This application is a continuation-in-part of my copending application, Ser. No. 102,179, filed Dec. 28, 1970, now abandoned which in turn is a continuation-in-part of my application Ser. No. 60,646, filed Aug. 3, 1970, now abandoned.

BACKGROUND OF THE INVENTION

The invention relates to an improved process for preparing symmetrical 4-(dialkylamino)phenols corresponding to the general formula (I)

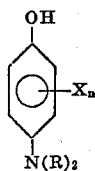

In this and succeeding formulae, R represents loweralkyl of 1 to 4 carbon atoms, or both R groups taken together with the nitrogen atom represented piperidino, morpholino or pyrrolidino; X represents loweralkyl of 1 to 4 carbon atoms or loweralkoxy of 1 to 4 carbon atoms and $n$ represents an integer of 0 to 3 with the proviso that when X is tertiary butyl or tertiary butoxy, that only one such moiety can be in a ring position alpha to the amino nitrogen.

Representative loweralkyl radicals include, for example, methyl, ethyl, n-propyl, isopropyl, n-butyl, secondary butyl and tertiary butyl as well as cyclopropyl and cyclobutyl. Representative loweralkoxy radicals include, for example, methoxy, ethoxy, n-propoxy, isopropoxy, n-butoxy, secondary butoxy and tertiary butoxy as well as cyclopropoxy and cyclobutoxy.

Compounds of the above formula are important materials in the field of commerce and their areas of activity are diverse. Some have utility in the area of photography as developing agents as set forth in British Pat. 928,671, U.S. Pat. 3,300,305 and Japanese Pat. 7,221,757. Many of the compounds are useful as gasoline antioxidants, rubber antioxidants, dye intermediates and germicides as taught in U.S. Pat. 2,375,311, Many are useful as gum inhibitors for gasoline as taught in U.S. Pat. 2,250,501 and 2,776,313. Others are useful in preparing pesticidally active sulfamates as taught in U.S. Pat. 3,082,238 and many are useful in preparing urethans having pharmacological activity as taught by Gardner, et al., J.A.C.S., 69, 3086-8 (1947).

These compounds have heretofore been prepared by a number of diverse and expensive processes such as the method taught in U.S. Pat. 3,060,225, wherein symmetrically substituted (dialkylamino)phenols are prepared by alkylating an appropriate 4-aminophenol with an alkylating agent such as an alkyl sulfate in the presence of sodium bicarbonate at 25° to 100° C. Another method is taught in U.S. Pat. 2,776,313 wherein (dialkylamino)phenols are prepared by reacting an N-monoalkyl-p-aminophenol with an aliphatic aldehyde in the presence of hydrogen and a hydrogenation catalyst at temperatures of 25° to 150° C. and hydrogen pressures of 500 to 5000 p.s.i.

While the above-described and other processes are effective, they are not entirely satisfactory and new and improved processes are continually being sought.

More particularly, these processes of the prior art are complicated by their cost and/or low yields and in some, by the need to employ more than one reaction step, and long reaction times.

SUMMARY OF THE INVENTION

It has now been found that symmetrical 4-(dialkylamino)phenols of formula I can be produced in desirably high yields and in a new and more economic process, by reacting in water or other inert polar solvent a 4-bromophenol corresponding to the formula

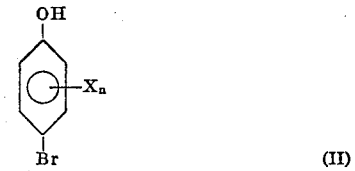

wherein X and $n$ are as set forth hereinbefore, with an amine type compound corresponding to the formula $$HN(R)_2 \qquad (III)$$

wherein R is as set forth hereinbefore.

Representative compounds embraced by formula I and which can be prepared by the process disclosed and claimed herein, include, for example, 4-(diethylamino)phenol,
4-(diethylamino)-2,3,5-trimethoxyphenol.
4-(di-n-propylamino)-3,5-dipropylphenol,
4-(dicyclopropylamino)-2,3,5-trimethylphenol,
4-(diisopropylamino)phenol,
4-(dicyclobutylamino)phenol,
4-dimethylamino)-2,6-dicyclobutoxyphenol,
4-(dimethylamino)-2,6-dicyclobutylphenol,
4-(diethylamino)-2-ethoxyphenol,
4-(di-isopropylamino)phenol,
4-(di-n-butylamino)phenol,
4-(dimethylamino)-2-methylphenol,
4-(dimethylamino)-3-ethylphenol,
4-(dimethylamino)-3-isopropylphenol,
4-(diethylamino)-2,6-ditertiarybutylphenol,
4-(diethylamino)-3-methoxyphenol,
4-(dimethylamino)-3,5-dimethylphenol,
4-(dimethylamino)-3,5-dimethoxyphenol,
4-(dimethylamino)phenol,
4-methylamino-3,5,6-trimethylphenol,
4-(dimethylamino)-3-methylphenol,
4-(dimethylamino)-2-methylphenol,
4-(di-n-butylamino)phenol,
4-(dibutylamino)-3,5-diethylphenol,
4-(di-n-butylamino)-3,5-di-n-butylphenol,
4-(di-n-butylamino)-2,3,5-trimethylphenol,
4-(dimethylamino)-2,3,5-trimethoxyphenol,
4-piperidino-3,5-dimethylphenol,
4-piperidinophenol,
4-pyrrolidinophenol,
4-pyrrolidino-3,5-dimethylphenol and
4-morpholino-3-butoxyphenol.

The desirable results of the present invention are obtained by reacting the 4-bromophenol reactant and the amine reactant in water or other inert polar solvent.

While it is preferred to employ water as the reaction medium, other inert polar solvents or mixtures of these solvents can optionally be employed.

Suitable inert polar solvents in addition to water which can be employed include methanol, ethanol, dioxane, dimethylformamide, dimethylsulfoxide, acetonitrile or aqueous solutions of any of these solvents.

It has been found to be practicable to employ molar ratios of the amine reactant to the phenol reactant of from about 1 to 1 to about 10 to 1. Although it is possible to use amounts beyond this, a decrease in the amount of the amine reactant below the indicated minimum results in a decrease in the yield. The weight ratio of the amine reactant to the amount of solvent is from about 1 to 10 up to about 10 to 1.

Representative phenol reactants include, for example, 4-bromophenol,
4-bromo-2-methylphenol,
4-bromo-3-methylphenol,
4-bromo-3-ethylphenol,
4-bromo-3-isopropylphenol,
4-bromo-3,5-dimethylphenol,
4-bromo-3,5-diethylphenol,
4-bromo-3,5-dipropylphenol,
4-bromo-3-methoxyphenol,
4-bromo-2,3,5-trimethylphenol,
4-bromo-2,6-di-cyclobutoxyphenol,
4-bromo-3,5-di-tertiarybutylphenol,
4-bromo-2,6-di-tertiarybutylphenol,
4-bromo-3,5-dimethoxyphenol,
4-bromo-2,3,5-trimethoxyphenol,
4-bromo-3-butoxyphenol,
4-bromo-3,5-di-n-butylphenol,
4-bromo-2,6-di-cyclobutylphenol and
4-bromo-2-ethoxyphenol.

Representative amine reactants include, for example, dimethylamine, diethylamine, di-n-propylamine, di-isopropylamine, dicyclopropylamine, di-sec-butylamine, di-t-butylamine, dicyclobutylamine, di-n-butylamine, piperidine, morpholine and pyrrolidine.

The present process is normally carried out at a temperature of from about 100° C. to about 300° C. and preferably between 150° C. and 250° C. The rate at which the formation of the symmetrical 4-(dialkylamino) phenols take place has been found to vary with the temperature employed; longer periods being employed at the lower temperature. The reaction can be carried out at atmospheric pressure depending upon the boiling point of the amine reactant and, preferably, the reaction should be carried out at above atmospheric pressure. For ease in operation, the reaction is preferably carried out in a closed vessel employing the autogenous pressure of the reactants. When operating within the preferred temperature limits, reaction times of from about 0.5 to about 24 hours are usually sufficient for practical completion.

In an additional procedure, product yield increases of from about 3 to about 10 percent above those obtained by the general procedure directly above can be obtained by carrying out the present process in the presence of an inert co-solvent which is immiscible with the amine-water phase. Representative co-solvents usable in the present process include, for example, toluene, benzene, xylene, hexane, heptane and methyl cyclohexane.

In an alternative procedure, substantial product yield increases of from about 5 to about 20 percent over the general procedure set forth above can be obtained by pumping the 4-bromophenol reactant, dissolved in a suitable solvent, into the hot amine solution over a period of from about 0.5 to about 6 hours.

At the completion of the reaction, the reaction mixture can be purified by conventional procedures. One such procedure is set forth hereinafter. The reaction mixture is extracted with a halohydrocarbon solvent such as, for example, methylene chloride, ethylene dichloride, chloroform or carbon tetrachloride. The solvent phase is further extracted with an aqueous acid such as, for example, aqueous hydrochloric acid, aqueous sulfuric acid, aqueous formic acid or aqueous acetic acid. The aqueous acidic phase is neutralized with a base such as, for example, aqueous ammonia, aqueous sodium hydroxide or aqueous potassium hydroxide and further extracted with one of the above-mentioned halohydrocarbon solvents. The solvent phase containing the crude product is dried, filtered and the solvent removed by conventional techniques such as evaporation under reduced pressure.

An alternate work-up procedure for product recovery comprises extracting the reaction mixture with a solvent such as ethylene dichloride followed by distillation of the solvent phase and finally distilling the product in a fractionating column under a partial vacuum.

DESCRIPTION OF SOME PREFERRED EMBODIMENTS

In order that the present invention may be more fully understood, the following examples are given primarily by way of illustration and should not be construed as limitations upon the overall scope of the present invention.

Example I

To a mixture of 225 grams (5 moles) of dimethylamine dissolved in 150 milliliters of water was added 86.5 grams (0.5 mole) of 4-bromophenol. The mixture was placed in a pressure reaction apparatus and heated for 5 hours at about 200° C. The pressure was about 540 pounds per square inch. Thereafter the reaction mixture was cooled, in the reactor, and acidified with concentrated hydrochloric acid and extracted with three 200 milliliter portions of methylene chloride. The solvent phase was neutralized with aqueous ammonia and again extracted with methylene chloride. The residual methylene chloride was removed by evaporation under reduced pressure leaving about 8 grams (~10 percent of theoretical) of a crude 4-dimethylaminophenol product. The product was recrystallized from petroleum ether and melted at 75°–77° C. Its structure was confirmed by nuclear magnetic resonance spectroscopy (N.M.R.).

Example II

To a mixture of 225 grams (5 moles) of dimethylamine dissolved in 150 milliliters of water was added 93.5 grams (0.5 mole) of 4-bromo-3-methylphenol. The mixture was placed in a pressure reaction apparatus and heated for 5 hours at 200°–205° C. The pressure was about 540 pounds per square inch. Thereafter the reaction mixture was cooled in the reactor and acidified with concentrated hydrochloric acid. The mixture was extracted with three 200 milliliter portions of methylene chloride and neutralized with aqueous ammonia followed by an extraction with three 200 milliliter portions of methylene chloride. Evaporation of the retained solvent gave ~41 grams (51 percent of theoretical) of 4-dimethylamino-3-methylphenol as the product. The product was confirmed by nuclear magnetic resonance spectroscopy (N.M.R.).

Example III

A homogeneous solution was prepared containing 100 grams (0.5 mole) of 4-bromo-3,5-dimethylphenol, 225 grams (5 moles) of dimetyhlamine and 150 milliliters of water. The solution was placed in a pressure reaction apparatus and heated for 2.5 hours at a temperature of 210° to 215° C. The reaction mixture was cooled in the closed vessel and thereafter removed and extracted with 300 milliliters of methylene chloride. The solvent phase was thereafter extracted with 500 millilters of aqueous hydrochloric acid (0.1 N), and neutralized with aqueous ammonia. The oil which precipitated was extracted wtih 300 milliliters of methylene chloride, dried over calcium sulfate, filtered, and the residual methylene chloride removed by evaporation under reduced pressure. The 4-dimethylamino-3,5-dimethylphenol product was recovered from the residue by distilling at 148°–150° C. at 5 millimeters of mercury in a yield of 49.8 grams (61 percent of theoretical) and melted at 84°–85° C.

Example IV

A mixture was prepared containing 50 grams (0.25 mole) of 4-bromo-3,5-dimethylphenol, 200 grams (2.35 moles) of piperidine and 200 milliliters of water. This mixture was placed in a pressure reaction vessel and heated at a temperature between 200°–225° C. for about 15 hours. To the reaction mixture was added 10 grams of sodium hydroxide and thereafter the water was removed by evaporation on a rotary evaporator. The residue was dissolved in a water-methylene chloride mixture and the water layer which formed was separated. The methylene chloride layer was washed with water followed by acidification with sulfuric acid. The acid layer was extracted with methylene chloride, filtered, neutralized with aqueous ammonia and filtered again. The 4-piperidino-3,5-dimethylphenol product was purified by sublimation and recovered in a yield of 22 grams (54 percent of theoretical). The structure was confirmed by nuclear magnetic resonance spectroscopy.

Example V

A mixture was prepared containing 50 grams (0.25 mole) of 4-bromo-3,5-dimethylphenol, 190 grams (2.7 moles) of pyrrolidine and 190 milliliters of water. This mixture was placed in a pressure reaction vessel and heated at a temperature between 210°–225° C. for about 2½ hours. The reaction mixture was treated in a manner substantially the same as set forth above in Example IV. The 4-pyrrolidino-3,5-dimethylphenol product was recovered in a yield of 21 grams (51 percent of theoretical).

Following the general procedure as set forth hereinabove, the following 4-(dialkylamino)phenols are prepared:

4-(dimethylamino)-2-methylphenol, having a molecular weight of 151.09, prepared by the reaction of 4-bromo-2-methylphenol and dimethylamine.

4-(dimethylamino) - 2,3,5 - trimethylphenol, having a molecular weight of 179.11, prepared by the reaction of 4-bromo-2,3,5-trimethylphenol and dimethylamine.

4-dimethylamino-2,3,5,6-tetramethoxyphenyl, having a molecular weight of 257.12, prepared by the reaction of 4-bromo-2,3,5,6-tetramethoxyphenol and dimethylamine.

4-morpholino-3-butoxyphenol, having a molecular weight of 251.14, prepared by the reaction of 4-bromo-3-butoxyphenol and morpholine.

4-dibutylamino-3,5-diethylphenol, having a molecular weight of 277.18, prepared by the reaction of 4-bromo-3,5-diethylphenol and dibutylamine.

Example VI

A solution, consisting of 202 grams (1.0 mole) of recrystalized 4-bromo-3,5-dimethylphenol in 150 milliliters of 40 percent aqueous dimethylamine, was pumped over a 3 hour period into a steel reaction vessel containing 1000 grams of 40 percent aqueous dimethylamine heated to a temperature of 190° C. at an autogenous pressure of 580 pounds per square inch. After a one hour post addition heating period to maintain the temperature, the reaction vessel was cooled and the unreacted dimethylamine removed by distillation. The residue remaining was extracted three times with 100 milliliter portions of methylene chloride and the extracts dried. The solvent was thereafter removed and the residue subjected to fractional distillation. The 4-dimethylamino - 3,5 - dimethylphenol product distilled at 152°–164° C. at 27 milliliters of mercury and was recovered in a yield of 120.5 grams (73 percent of theoretical).

By following the above examples and employing the appropriate amine and phenol reactants, the 4-(dialkylamino)-phenols of this invention, which are not shown being prepared by example, are prepared.

Preparation of Starting Materials

The 4-bromophenols employed as starting materials are prepared by a procedure similar to the one taught in U.S. Pat. 2,719,851 wherein an appropriate phenol in glacial acetic acid is treated with a solution of bromine in glacial acetic acid at a temperature of from 15°–25° C. The desired 4-bromophenol product is obtained by treating the product mixture with ice and 50 percent sodium hydroxide followed by recrystallization from a solvent such as n-pentane.

What is claimed is:

1. A process for preparing symmetrical 4-(dialkylamino)phenols corresponding to the formula

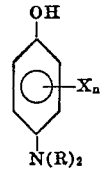

wherein R represents loweralkyl of 1 to 4 carbon atoms or both R groups taken together with the nitrogen atom represent piperidino, morpholino or pyrrolidino; X represents loweralkyl of 1 to 4 carbon atoms or loweralkoxy of 1 to 4 carbon atoms and $n$ represents an integer of 0 to 3 with the proviso that when X is tertiary butyl or tertiary butoxy, that only one such moiety can be in a ring position alpha to the amino nitrogen, which consists essentially of reacting in an inert polar solvent, a 4-bromophenol of the formula

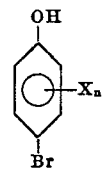

wherein X and $n$ are as set forth hereinbefore, with a compound of the formula

wherein R is as set forth hereinbefore, at a pressure above atmospheric pressure and at a temperature of from about 100° C. to about 300° C.

2. The process as defined in Claim 1 wherein the inert polar solvent is water and the temperature is from about 150° to about 250° C.

3. The process as defined in Claim 2 wherein an inert co-solvent is also employed.

4. The process as defined in Claim 2 wherein the process is carried out in a closed reaction vessel employing the autogenous pressure of the reactants.

5. The process as defined in Claim 1 wherein the 4-bromophenol reactant is 4-bromo-3,5-dimethylphenol and the amine reactant is dimethylamine.

6. The process as defined in Claim 5 wherein the inert polar solvent is water and the temperature is from about 150° to about 250° C.

7. The process as defined in Claim 5 wherein the phenol reactant is added to a previously heated amine reactant.

8. The process as defined in Claim 6 wherein an inert co-solvent is also employed.

9. The process as defined in Claim 1 wherein the 4-bromophenol is 4-bromo-3-methylphenol and the amine reactant is dimethylamine.

10. The process as defined in Claim 1 wherein the molar ratios of the amine reactant to the phenol reactant is from about 1 to 1 to about 10 to 1 and the weight ratio of the amine reactant to the amount of solvent is from about 1 to 10 to about 10 to 1.

11. The process as defined in Claim 1 wherein the amine reactant is dimethylamine and the phenol reactant is 4-bromophenol.

12. The process as defined in Claim 1 wherein the amine reactant is piperidine and the phenol reactant is 4-bromo-3,5-dimethylphenol.

13. The process as defined in Claim 1 wherein the amine reactant is pyrrolidine and the phenol reactant is 4-bromo-3,5-dimethylphenol.

References Cited
UNITED STATES PATENTS
2,618,657  11/1952  Vaughn et al. _____ 260—570.5

NORMA S. MILESTONE, Primary Examiner
S. D. WINTERS, Assistant Examiner

U.S. Cl. X.R.
260—247.7 A, 247.7 C, 293.83, 326.5 M, 326.5 R, 574, 613 D, 623 R